(12) United States Patent
Cagnani et al.

(10) Patent No.: US 7,816,466 B2
(45) Date of Patent: Oct. 19, 2010

(54) PROPYLENE POLYMER COMPOSITION FOR INJECTION MOLDING

(75) Inventors: Camillo Cagnani, Ferrara (IT); Roberta Marzolla, Occhiobello (IT)

(73) Assignee: Basell Poliolefine Italia s.r.l., Milan (IT)

( * ) Notice: Subject to any disclaimer, the term of this patent is extended or adjusted under 35 U.S.C. 154(b) by 608 days.

(21) Appl. No.: 11/883,716

(22) PCT Filed: Jan. 20, 2006

(86) PCT No.: PCT/EP2006/050324

§ 371 (c)(1),
(2), (4) Date: Aug. 3, 2007

(87) PCT Pub. No.: WO2006/082144

PCT Pub. Date: Aug. 10, 2006

(65) Prior Publication Data

US 2008/0090982 A1    Apr. 17, 2008

Related U.S. Application Data

(60) Provisional application No. 60/652,176, filed on Feb. 10, 2005.

(30) Foreign Application Priority Data

Feb. 3, 2005  (EP) ................... 05100744

(51) Int. Cl.
C08F 2/00       (2006.01)
C08F 210/00   (2006.01)

(52) U.S. Cl. ............................. 526/73; 526/348; 526/65

(58) Field of Classification Search ................ 526/73, 526/348, 65
See application file for complete search history.

(56) References Cited

U.S. PATENT DOCUMENTS

| | | | |
|---|---|---|---|
| 4,399,054 A | 8/1983 | Ferraris et al. | |
| 4,469,648 A | 9/1984 | Ferraris et al. | |
| 4,634,740 A | 1/1987 | Fujita et al. | |
| 4,916,198 A | 4/1990 | Scheve et al. | |
| 5,047,485 A | 9/1991 | DeNicola, Jr. | |
| 5,338,764 A | 8/1994 | Lesca et al. | |
| 5,362,782 A | 11/1994 | McCullough, Jr. et al. | |
| 5,587,436 A | 12/1996 | Klimek et al. | |
| 6,022,628 A | 2/2000 | Chatterjee et al. | |
| 6,303,709 B1 | 10/2001 | Jauniaux | |
| 6,716,921 B1 * | 4/2004 | Nakashima et al. | 525/191 |
| 6,800,710 B2 | 10/2004 | Pelliconi et al. | |
| 7,294,681 B2 | 11/2007 | Jiang et al. | |
| 7,381,773 B2 | 6/2008 | Pelliconi et al. | |
| 7,390,575 B2 | 6/2008 | Tayano et al. | |
| 2009/0030098 A1 | 1/2009 | Cagnani et al. | |

FOREIGN PATENT DOCUMENTS

| | | |
|---|---|---|
| EP | 45977 | 2/1982 |
| EP | 361494 | 4/1990 |
| EP | 395083 | 10/1990 |
| EP | 553805 | 8/1993 |
| EP | 553806 | 8/1993 |
| EP | 560035 | 9/1993 |
| EP | 573862 | 12/1993 |
| EP | 601525 | 6/1994 |
| EP | 634441 | 1/1995 |
| EP | 728769 | 8/1996 |
| EP | 757069 | 2/1997 |
| EP | 782587 | 7/1997 |
| EP | 942013 | 9/1999 |
| EP | 1026198 | 8/2000 |
| EP | 1038893 | 9/2000 |
| EP | 1242483 | 9/2002 |
| EP | 1272533 | 1/2003 |
| EP | 1428853 | 6/2004 |
| EP | 1448622 | 8/2004 |
| EP | 1674530 | 6/2006 |
| WO | 98/44009 | 10/1998 |
| WO | 99/16797 | 4/1999 |
| WO | 99/36466 | 7/1999 |
| WO | 00/02929 | 1/2000 |
| WO | 00/63261 | 10/2000 |
| WO | 01/92406 | 12/2001 |
| WO | 02/30998 | 4/2002 |
| WO | WO 03/051984 A1 * | 6/2003 |
| WO | 03/082971 | 10/2003 |
| WO | 2005/113622 | 12/2005 |
| WO | 2006/114357 | 11/2006 |
| WO | 2006/120190 | 11/2006 |
| WO | 2007/003523 | 1/2007 |

* cited by examiner

*Primary Examiner*—William K Cheung
(74) *Attorney, Agent, or Firm*—Jarrod N. Raphael; Kevin M. Carroll

(57) ABSTRACT

A propylene polymer composition comprising (weight percentages being referred to the sum of A+B): (A) 75-95% by weight of a copolymer of propylene comprising from 0.5 to 3.0 mole % of comonomer units derived from ethylene and/or C4-C8 alpha-olefins; and (B) 5-25% by weight of a copolymer of propylene comprising from 25 to 45 mole % of ethylene units, said propylene polymer composition having a melt flow rate value according to ISO 1133 (230° C., 2.16 Kg) of from 20 to 40 g/10 min.

3 Claims, No Drawings

PROPYLENE POLYMER COMPOSITION FOR INJECTION MOLDING

The present invention relates to thermoplastic polyolefin compositions and to articles obtained therefrom. In particular, the compositions described herein below are suitable for the production of molded articles having good flexibility and good impact properties, and being also endowed with good transparency.

It is known from the prior art that low release of chemical substances is highly desirable for articles to be used in contact with food. The European patent application EP1448622 describes thermoplastic polyolefin compositions suitable for producing injection-molded articles having low hexane-extractable moiety; said compositions comprise a propylene copolymer having xylene-insoluble fraction of not less than 85 wt % and a propylene copolymer with 8-40 wt % of alpha-olefin and has a (MFR L) of 3-30 g/10 min. The above-mentioned values of (MFR L) are obtained by subjecting to peroxidic degradation a precursor composition having a lower "MFR L". However, the peroxidic degradation enhance the "Yellowness Index" of the polyolefins and the propylene polymer compositions thus obtained, normally white, turn to a yellowish color. Moreover, the peroxidic degradation normally results in the formation of smelly chemicals that can impair the use of visbroken polyolefins in food applications.

Therefore, it was an object of the present invention to provide new thermoplastic polyolefin compositions having a good balance of flexibility and impact properties at desired fluidity, avoiding the drawbacks associated with peroxidic degradation.

The present invention provides propylene polymer compositions comprising (weight percentages being referred to the sum of A+B):

(A) 75-95% by weight of a copolymer of propylene comprising from 0.5 to 3.0 mole %, preferably from 1.5 to 2.2 mole %, of comonomer units derived from ethylene and/or $C_4$-$C_8$ alpha-olefins; and (B) 5-25% by weight of a copolymer of propylene comprising from 25 to 45 mole %, preferably from 30 to 37 mole % of ethylene units, said polymer composition having a melt flow rate value according to ISO 1133 (230° C., 2.16 Kg) of from 20 to 40 g/10 min., preferably from 30 to 35 g/10 min. Preferably, the propylene polymer compositions of the invention comprise 80-90% by weight of component (A) and 10-20% by weight of component (B).

The $C_4$-$C_8$ alpha-olefins that may be present in the component (A) are linear or branched alpha-olefins of formula $CH_2$=CHR, where R is an alkyl radical with 2 to 6 carbon atoms. Examples of such $C_4$-$C_8$ alpha-olefins are 1-butene, 1-pentene, 1-hexene, 4-methyl-1-pentene and 1-octene.

In a particularly preferred embodiment of the invention, the component (A) is a copolymer of propylene and ethylene.

In a further preferred embodiment, the component (A) of the propylene polymer compositions of the present invention has a xylene-soluble fraction at 25° C. lower than 4.5% by weight. The xylene-soluble fraction is determined according to the method described hereinbelow.

For the most preferred propylene polymer compositions of the present invention the value of the equation $$XS(tot) \times [C2(tot) - C2(A)] \quad (1)$$

is higher than or equal to 35, preferably higher than 65, wherein C2(A) is the mole percent of comonomers in the copolymer (A), C2(tot) is the total mole percent of comonomers in the propylene polymer composition and XS(tot) is the total xylene-soluble fraction of the propylene polymer composition (percent by weight). It has been surprisingly found that when the value of the equation (1) is higher then the above-mentioned critical values, the propylene polymer compositions of the present invention show a favorable balance of rigidity (flexural modulus), impact resistance (in terms of ductile/brittle transition temperature) and transparency (haze). The propylene polymer compositions of the invention typically have a flexural modulus lower than 1200 MPa, preferably comprised in the range of from 950 and 1100 MPa and a ductile/brittle transition temperature not higher than 10° C., preferably not higher than 0° C. Moreover, said propylene polymer compositions typically have a haze value measured on 1 mm plaque not higher than 40%, preferably not higher than 30%.

The intrinsic viscosity of the component (B) influences the haze of the propylene polymer composition of the invention; the lower the intrinsic viscosity of the component (B) the lower the haze value of the propylene polymer composition. The intrinsic viscosity of the component (B) should however not be too low. The value of the intrinsic viscosity of the component (B) is normally comprised between 0.5 dl/g and 3.5 dl/g, preferably between 0.8 dl/g and 2.0 dl/g.

The propylene polymer compositions of the invention are characterized by a value of the Yellowness Index lower than 1.0 and they are further characterized by a low hexane extractable fraction, lower than 6.0 wt %, preferably lower than 5.0 wt %.

The propylene polymer compositions of the present invention can be prepared by sequential polymerization in at least two stages, with each subsequent polymerization stage being conducted in the presence of the polymeric material formed in the immediately preceding polymerization reaction, wherein the copolymer (A) is normally prepared in at least one first polymerization stage and the copolymer (B) is normally prepared in at least one second polymerization stage.

Preferably, each polymerization stage is carried out in presence of a highly stereospecific heterogeneous Ziegler-Natta catalyst. The Ziegler-Natta catalysts suitable for producing the propylene polymer compositions of the invention comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound.

Suitable catalysts systems are described in the European patents EP45977, EP361494, EP728769, EP 1272533 and in the international patent application WO00/63261. Preferably, the solid catalyst component comprises Mg, Ti, halogen and an electron donor selected from succinates of formula (I):

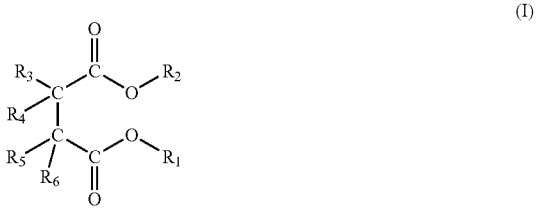

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

$R_1$ and $R_2$ are preferably $C_1$-$C_8$ alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (I) is that in which $R_3$ to $R_5$ are hydrogen and $R_6$ is a branched alkyl, cycloalkyl, aryl, arylalkyl and alkylaryl radical having from 3 to 10 carbon atoms. Another preferred group of compounds within those of formula (I) is that in which at least two radicals from $R_3$ to $R_6$ are different from hydrogen and are selected from $C_1$-$C_{20}$ linear or branched alkyl, alkenyl, cycloalkyl, aryl, arylalkyl or alkylaryl group, optionally containing heteroatoms. Particularly preferred are the compounds in which the two radicals different from hydrogen are linked to the same carbon atom. Furthermore, also the compounds in which at least two radicals different from hydrogen are linked to different carbon atoms, that is $R_3$ and $R_5$ or $R_4$ and $R_6$ are particularly preferred.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The internal donor can be added during the treatment with $TiCl_4$ and the treatment with the electron donor compound can be repeated one or more times. Generally, the succinate of formula (I) is used in molar ratio with respect to the $MgCl_2$ of from 0.01 to 1 preferably from 0.05 to 0.5. The preparation of catalyst components in spherical form is described for example in European patent application EP-A-395083 and in the International patent application WO98/44001. The solid catalyst components obtained according to the above method show a surface area (by B.E.T. method) generally between 20 and 500 m²/g and preferably between 50 and 400 m²/g, and a total porosity (by B.E.T. method) higher than 0.2 cm³/g preferably between 0.2 and 0.6 cm³/g.

The porosity (Hg method) due to pores with radius up to 10.000 Å generally ranges from 0.3 to 1.5 cm³/g, preferably from 0.45 to 1 cm³/g.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

Preferred external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula $R_a^5 R_b^6 Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1, trifluoropropyl-metil-dimethoxysilane. The external electron donor compound is used in such an amount to give a molar ratio between the organo-aluminum compound and said electron donor compound of from 0.1 to 500.

The polymerization process can be carried out in gas phase and/or in liquid phase, in continuous or batch reactors, such as fluidized bed or slurry reactors. For example, it is possible to carry out the polymerization of the propylene polymer (A) in liquid phase, using liquid propylene as diluent, while the copolymerization stage to obtain the propylene copolymer fraction (B) is carried out in gas phase, without intermediate stages except for the partial degassing of the monomers. Alternatively, all the sequential polymerization stages can be carried out in gas phase. The reaction time, temperature and pressure of the polymerization steps are not critical, however the temperature for the preparation of fraction (A) and (B), that can be the same or different, is usually from 50° C. to 120° C. The polymerization pressure preferably ranges from 0.5 to 12 MPa if the polymerization is carried out in gas-phase. The catalytic system can be pre-contacted (pre-polymerized) with small amounts of olefins. The molecular weight of the propylene polymer composition is regulated by using known regulators, such as hydrogen.

According to a preferred embodiment, the propylene polymer (A) is produced by a gas-phase polymerization process carried out in at least two interconnected polymerization zones. Said polymerization process is described in the European patent EP 782587.

The process is carried out in a first and in a second interconnected polymerization zone to which propylene and ethylene or propylene and alpha-olefins are fed in the presence of a catalyst system and from which the polymer produced is discharged. The growing polymer particles flow through the first of said polymerization zones (riser) under fast fluidization conditions, leave said first polymerization zone and enter the second of said polymerization zones (downcomer) through which they flow in a densified form under the action of gravity, leave said second polymerization zone and are reintroduced into said first polymerization zone, thus establishing a circulation of polymer between the two polymerization zones. Generally, the conditions of fast fluidization in the first polymerization zone is established by feeding the monomers gas mixture below the point of reintroduction of the growing polymer into said first polymerization zone. The velocity of the transport gas into the first polymerization zone is higher than the transport velocity under the operating conditions and is normally between 2 and 15 m/s. In the second polymerization zone, where the polymer flows in densified form under the action of gravity, high values of density of the solid are reached which approach the bulk density of the polymer; a positive gain in pressure can thus be obtained along the direction of flow, so that it becomes possible to reintroduce the polymer into the first reaction zone without the help of mechanical means. In this way, a "loop" circulation is set up, which is defined by the balance of pressures between the two polymerization zones and by the head loss introduced into the system. Optionally, one or more inert gases, such as nitrogen or an aliphatic hydrocarbon, are maintained in the polymerization zones, in such quantities that the sum of the partial pressures of the inert gases is preferably between 5 and 80% of the total pressure of the gases. The operating parameters such as, for example, the temperature are those that are usual in gas-phase olefin polymerization processes, for example between 50° C. and 120° C. The process can be carried out under operating pressure of between 0.5 and 10 MPa, preferably between 1.5 and 6 MPa. Preferably, the various catalyst components are fed to the first polymerization zone, at any point of said first polymerization zone. However, they can also be fed at any point of the second polymerization zone. Molecular weight regulators known in the art, particularly hydrogen, can be used to regulate the molecular weight of the growing polymer.

In the second stage of the particularly preferred polymerization process, the propylene/ethylene copolymer (B) is produced in a conventional fluidized-bed gas-phase reactor in the presence of the polymeric material and the catalyst system coming from the preceding polymerization step. The polymerization mixture is discharged from the downcomer to a gas-solid separator, and subsequently fed to the fluidized-bed gas-phase reactor operating under conventional conditions of temperature and pressure.

The propylene polymer compositions of the present invention can also be obtained by separately preparing the said copolymers (A) and (B), operating with the same catalysts and substantially under the same polymerization conditions as previously illustrated and subsequently mechanically blending said copolymers in the molten state using conventional mixing apparatuses, like twin-screw extruders.

The propylene polymer compositions of the present invention may further comprise additives commonly employed in the polyolefin field, such as antioxidants, light stabilizers, nucleating agents, antiacids, colorants and fillers.

The main application of the propylene polymer compositions of the invention is the production of molded articles, particularly injection-molded items. The injection-molded articles comprising the propylene polymer compositions of the invention have good flexibility and good impact properties and are also endowed with good transparency. Due to the low hexane-extractable fraction of the polyolefin compositions of the invention and to the absence of smelly end-products of peroxidic degradation, the injection-molded articles obtained therefrom are particularly suitable for food applications. The said injection-molded articles have a Yellowness Index of less than 1.0.

The following examples are given to illustrate and not to limit the present invention.

EXAMPLES

The data of the propylene polymer materials were obtained according to the following methods:

Xylene-Soluble Faction 2.5 g of polymer and 250 mL of o-xylene are introduced in a glass flask equipped with a refrigerator and a magnetical stirrer. The temperature is raised in 30 minutes up to the boiling pint of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and the filtered liquid is divided into two 100 ml aliquots. One 100 ml aliquots of the filtered liquid is poured in a previously weighed aluminum container, which is heated on a heating plate under nitrogen flow, to remove the solvent by evaporation. The container is then kept on an oven at 80° C. under vacuum until constant weight is obtained. The residue is weighed to determine the percentage of xylene-soluble polymer.

Comonomer (C2) Content

By IR spectroscopy.

The comonomer content of the Component B is determined on the precipitated "amorphous" fraction of the polymer. The precipitated "amorphous" fraction is obtained as follows: to one 100 ml aliquot of the filtered liquid obtained as described above 200 ml of acetone are added under vigorous stirring. Precipitation must be complete as evidenced by a clear solid-solution separation. The solid thus obtained is filtered on a tared metallic screen and dried in a vacuum oven at 70° C. until a constant weight is reached.

Molar Ratio of Feed Gasses
Determined by gas-chromatography

Melt Flow Rate (MFR)
Determined according to ISO 1133 (230° C., 2.16 Kg)

Intrinsic Viscosity
Determined in tetrahydronaphthalene at 135° C.

Flexural Modulus
Determined according to ISO 178

Stress at Yield and at Break
Determined according to ISO 527

Elongation at Yield and Break
Determined according to ISO 527

IZOD Impact Strength
Determined according to ISO 180/1A

Ductile/Brittle Transition Temperature (D/B)

According to this method, the bi-axial impact resistance is determined through impact with an automatic, computerized striking hammer.

The circular test specimens are obtained by cutting with circular hand punch (38 mm diameter). They are conditioned for at least 12 hours at 23° C. and 50 RH and then placed in a thermostatic bath at testing temperature for 1 hour. The force-time curve is detected during impact of a striking hammer (5.3 kg, hemispheric punch with a ½" diameter) on a circular specimen resting on a ring support. The machine used is a CEAST 6758/000 type model no. 2.

D/B transition temperature is the temperature at which 50% of the samples undergoes fragile break when submitted to the above-mentioned impact test.

The plaques for D/B measurements, having dimensions of 127×127×1.5 mm are prepared according to the following method.

The injection press is a Negri BOSSi™ type (NB 90) with a clamping force of 90 tons. The mould is a rectangular plaque (127×127×1.5 mm).

The main process parameters are reported below:

| | |
|---|---|
| Back pressure (bar): | 20 |
| Injection time (s): | 3 |
| Maximum Injection pressure (MPa): | 14 |
| Hydraulic injection pressure (MPa): | 6-3 |
| First holding hydraulic pressure (MPa): | 4 ± 2 |
| First holding time (s): | 3 |
| Second holding hydraulic pressure (MPa): | 3 ± 2 |
| Second holding time (s): | 7 |
| Cooling time (s): | 20 |
| Mould temperature (° C.): | 60 |

The melt temperature is between 220 and 280° C.

Haze (on 1 mm plaque)

According to the method used, 5×5 cm specimens are cut molded plaques of 1 mm thick and the haze value is measured using a Gardner photometric unit connected to a Hazemeter type UX-10 or an equivalent instrument having G.E. 1209 light source with filter "C". Reference samples of known haze are used for calibrating the instrument. The plaques to be tested are produced according to the following method. 75×75×1 mm plaques are molded with a GBF Plastiniector G235/90 Injection Molding Machine, 90 tons under the following processing conditions:

| | |
|---|---|
| Screw rotation speed: | 120 rpm |
| Back pressure: | 10 bar |
| Melt temperature: | 260° C. |
| Injection time: | 5 sec |
| Switch to hold pressure: | 50 bar |
| First stage hold pressure: | 30 bar |
| Second stage pressure: | 20 bar |
| Hold pressure profile: | First stage 5 sec |
| | Second stage 10 sec |
| Cooling time: | 20 sec |
| Mold water temperature: | 40° C. |

Hexane Extractable

The hexane extractable fraction is determined according to modified FDA method (federal registration, title 21, Chapter 1, part 177, section 1520, s. Annex B) on polymer formed into 100 Mm thick items Melting Temperature, Melting Enthalpy and Crystallization Temperature Determined by DSC with a temperature variation of 20° C. per minute Yellowness Index The determination of the yellowness index (YI) is obtained by directly measuring the X, Y and Z tristimulus coordinates on pellets using a tristimulus calorimeter capable of assessing the deviation of an object color from a pre-set standard white towards yellow in a dominant wavelength range between 570 and 580 nm. The geometric characteristics of the apparatus should allow perpendicular viewing of the light reflected by two light rays that hit the specimen at 45°, at an angle of 90° to each other, coming from a "Source C" according to CIE standard. After calibration, the glass container is filled with the pellets to be tested and the X, Y, Z coordinates are obtained to calculate the yellowness index according to the following equation:

$$YI=100*(1.274976795*X-1.058398178*Z)/Y$$

Examples 1-4

The solid catalyst used in the following examples was prepared according to the Example 10 of the International Patent Application WO 00/63261. Triethylaluminium (TEAl) was used as co-catalyst and dicyclopentyldimethoxysilane as external donor, with the weight ratios indicated in Table 1.

The propylene polymer compositions of the examples were prepared in a two-step polymerization process, wherein the copolymer (A) was prepared in the first polymerization step by feeing the monomers and the catalyst system to a gas-phase polymerization reactor comprising two interconnected polymerization zones, a riser and a downcomer, as described in the European Patent EP782587. The polymerization mixture was discharged from said reactor, conveyed to a gas-solid separator and the polymerized material was sent into a conventional gas-phase fluidized-bed reactor where the propylene/ethylene copolymer (B) was produced. The operative conditions are indicated in Table 1.

The polymer particles exiting from the second polymerization step were subjected to a steam treatment to remove the unreacted monomers and dried.

The propylene polymer compositions were added with the additives indicated in Table 2 and extruded in a twin-screw extruder Berstorff (L/D=33) under the following operating conditions:

| | |
|---|---|
| Temperature of the feeding section: | 190-210° C. |
| Melt temperature: | 240° C. |
| Temperature of the die section: | 230° C. |
| Flow rate: | 16 Kg/h |
| Rotational speed: | 250 rpm |

The properties measured on the samples are collected in Table 2.

TABLE 1

| | | EXAMPLE | | | |
|---|---|---|---|---|---|
| | | 1 | 2 | 3 | 4 |
| TEA/Donor | g/g | 6 | 6 | 6 | 4 |
| TEA/Catalyst | g/g | 5 | 5 | 5 | 5 |
| Component A | | | | | |
| Temperature | ° C. | 75 | 75 | 75 | 75 |
| Pressure | MPa | 2.8 | 2.8 | 2.8 | 2.8 |
| H2/C3 | mol/mol | 0.0602 | 0.0674 | 0.0643 | 0.0613 |
| MFR | g/10' | 38 | 43 | 44 | 41.1 |
| C2 (A) | mole % | 1.9 | 2.7 | 1.9 | 1.9 |
| X.S. | wt % | 3.7 | 4.1 | 3.2 | 3.3 |
| Component B | | | | | |
| Temperature | ° C. | 75 | 75 | 75 | 75 |
| Pressure | bar | 18 | 18 | 18 | 18 |
| Split | wt % | 14 | 11 | 16 | 14 |
| C2 (B) | mole % | 29.7 | 30.6 | 29.6 | 29.7 |
| C2−/C2− + C3− | mol/mol | 0.090 | 0.092 | 0.089 | 0.087 |

TABLE 1-continued

|  |  | EXAMPLE | | | |
|---|---|---|---|---|---|
|  |  | 1 | 2 | 3 | 4 |
| Final composition | | | | | |
| MFR | g/10' | 26.4 | 30.5 | 33 | 36.6 |
| C2 (tot) | mole % | 6.2 | 6.0 | 6.7 | 6.2 |
| X.S (tot) | wt % | 14.9 | 11.8 | 14.5 | 12.7 |
| X.S.I.V. | dl/g | 1.9 | 1.59 | 1.26 | 1.23 |
| [C2 (tot) − C2 (A)] * XS (tot) | | 64 | 39 | 70 | 55 |

TABLE 2

|  |  | EXAMPLE | | | |
|---|---|---|---|---|---|
|  |  | 1 | 2 | 3 | 4 |
| Pellets formulation | | | | | |
| Irganox 1010 | wt % | 0.05 | 0.05 | 0.08 | 0.08 |
| Irgafos 168 | wt % | 0.1 | 0.1 | 0.08 | 0.08 |
| Calcium Stearate | wt % | 0.04 | 0.04 | 0.04 | 0.04 |
| Millad 3988 | wt % | 0.18 | 0.18 | 0.18 | 0.18 |
| GMS 90 | wt % | — | — | 0.05 | 0.05 |
| Characterization | | | | | |
| Flexural modulus | MPa | 1106 | 1118 | 1045 | 1161 |
| Stress at yield | MPa | — | — | 26.8 | — |
| Elongation at yield | % | — | — | 23.1 | — |
| Stress at break | MPa | — | — | 17.4 | — |
| Elongation at break | % | — | — | 445 | — |
| IZOD 23° C. | kJ/m² | 4.5 | 4.4 | 5.1 | 4.3 |
| IZOD 0° C. | kJ/m² | 3.7 | 3.2 | 3.9 | 3.2 |
| IZOD −20° C. | kJ/m² | 2.2 | 1.5 | 2.4 | 1.5 |
| D/B transition temperature | ° C. | 1.1 | 2.3 | −2.5 | 5.3 |
| Haze (on 1 mm plaque) | % | 27.4 | 26.8 | 22.3 | 11.8 |
| Hexane extractable | % | — | — | 4.6 | — |
| Melting temperature | ° C. | 157 | 154 | 157 | 157 |
| Melting enthalpy | J/g | 87 | 80 | 85 | 93 |
| Crystallization temperature | ° C. | 121 | 116 | 121 | 121 |
| Yellowness Index | | — | — | 0.4 | — |

Irganox 1010 - Phenolic antioxidant ans long-term stabilizer supplied by Ciba Specialty;
Irgafos 168 - Stabilizer supplied by Ciba
Millad 3988 - Nucleating agent supplied by Milliken Europe
GMS 90 - antistatic agent supplied by Ciba Specialty Chemicals S.p.A.

Example 5

The solid catalyst used in the following example was prepared according to the Example 1 of the European Patent EP728769. Triethylaluminium (TEAl) was used as co-catalyst and dicyclopentyldimethoxysilane as external donor, with the weight ratios indicated in Table 3 together with the polymerization conditions.

The propylene polymer composition was prepared in two polymerization stages, whereby the copolymer (A) was prepared in the first polymerization stage carried out in liquid phase in two sequential loop reactors operating under the same polymerization conditions and the copolymer (B) was produced in two sequential gas-phase fluidized bed reactors. The reactors were equipped with devices for the transfer and the optional degassing of the polymerization mixture.

The polymer particles exiting from the second gas-phase reactor were subjected to a steam treatment to remove the unreacted monomers and dried. The propylene polymer composition was added with 0.05 wt % of Irganox 1010, 0.1 wt % of Irgafos 168, 0.04 wt % of Ca-stearate and 0.18 wt % of Millad 3988 in a twin-screw extruder Berstorff ZE25 operating under the conditions described in Examples 1-4.

The properties of the propylene polymer composition are collected in Table 4.

TABLE 3

| EXAMPLE 5 | | |
|---|---|---|
| TEA/Donor | g/g | 74 |
| TEA/Catalyst | g/g | 20 |
| 1st loop reactor | | |
| Temperature | ° C. | 67 |
| Pressure | bar | 40 |
| 2nd loop reactor | | |
| Temperature | ° C. | 67 |
| Pressure | bar | 40 |
| 1st gas-phase reactor | | |
| Temperature | ° C. | 80 |
| Pressure | bar | 19 |
| C2/C2 + C3 | mol/mol | 0.13 |
| X.S. | wt % | 10.5 |
| X.S.I.V. | dl/g | 1.03 |
| 2nd gas-phase reactor | | |
| Temperature | ° C. | 80 |
| Pressure | bar | 17 |
| C2/C2 + C3 | mol/mol | 0.13 |
| X.S. | wt % | 15.3 |
| X.S.I.V. | dl/g | 1.00 |

TABLE 4

| EXAMPLE 5 | | |
|---|---|---|
| Component (A) | | |
| C2 (A) | mole % | 2.3 |
| MFR | g/10 min | 37 |
| X.S. | wt % | 3.1 |
| Component (B) | | |
| Split (*) | wt % | 14.5 |
| C2 (B) | mole % | 33.3 |
| Final composition | | |
| MFR | g/10 min | 38 |
| C2 (tot) | mole % | 7.4 |
| X.S (tot) | wt % | 15.3 |
| X.S.I.V. | dl/g | 1.0 |
| [C2 (tot) − C2 (A)] * XS (tot) | | 78 |
| Properties | | |
| Flexural Modulus | MPa | 895 |
| IZOD at 23° C. | kJ/m² | 5.2 |
| D/B transition temperature | ° C. | −10 |
| Haze (on 1 mm plaque) | % | 18 |
| Melting temperature | ° C. | 158 |
| Crystallization temperature | ° C. | 117 |

(*) the split corresponds to the total amount of component (B) produced in the two gas-phase reactors.

The invention claimed is:

1. A process for preparing a propylene polymer composition comprising (weight percentages being referred to as a sum of A+B):
   (A) 75-95% by weight of a copolymer of propylene comprising from 1.5 to 2.2 mole % of comonomer units derived from ethylene, a $C_4$-$C_8$ alpha-olefin, or mixtures thereof; and
   (B) 5-25% by weight of a copolymer of propylene comprising from 25 to 45 Mole % of ethylene units;

the propylene polymer composition comprising a melt flow rate value of from 30 to 35 g/10 min according to ISO 1133 (230° C., 2.16 Kg);

the process comprising at least two sequential polymerization steps wherein the copolymer (A) is prepared in at least one first polymerization step and the copolymer (B) is prepared in at least one second polymerization step; and wherein the copolymer (A) is produced by a gas-phase polymerization process carried out in at least two interconnected polymerization zones.

2. An injection-molded article comprising (weight percentages being referred to as a sum of A+B):

(A) 75-95% by weight of a copolymer of propylene comprising from 1.5 to 2.2 mole % of comonomer units derived from ethylene, a $C_4$-$C_8$ alpha-olefin, or mixtures thereof; and (B) 5-25% by weight of a copolymer of propylene comprising from 25 to 45 mole % of ethylene units;

the propylene polymer composition comprising a melt flow rate value of from 30 to 35 g/10 min according to ISO 1133 (230° C., 2.16 Kg).

3. The injection-molded article according to claim 2, wherein the injection-molded article comprises a Yellowness Index of less than 1.0.

* * * * *